United States Patent
Ban et al.

(10) Patent No.: US 9,050,728 B2
(45) Date of Patent: Jun. 9, 2015

(54) APPARATUS AND METHOD FOR MEASURING TOOL CENTER POINT POSITION OF ROBOT

(71) Applicant: FANUC LTD, Minamitsuru-gun, Yamanashi (JP)

(72) Inventors: Kazunori Ban, Yamanashi (JP); Katsutoshi Takizawa, Yamanashi (JP); Gang Shen, Yamanashi (JP)

(73) Assignee: FANUC LTD, Minamitsuru-gun, Yamanashi (JP)

( * ) Notice: Subject to any disclaimer, the term of this patent is extended or adjusted under 35 U.S.C. 154(b) by 0 days.

(21) Appl. No.: 14/173,373

(22) Filed: Feb. 5, 2014

(65) Prior Publication Data

US 2014/0156072 A1 Jun. 5, 2014

Related U.S. Application Data

(63) Continuation of application No. 12/838,046, filed on Jul. 16, 2010, now abandoned.

(30) Foreign Application Priority Data

Aug. 3, 2009 (JP) ................................. 2009-180757

(51) Int. Cl.
*G05B 19/04* (2006.01)
*G05B 19/18* (2006.01)
*B25J 9/16* (2006.01)

(52) U.S. Cl.
CPC .............. *B25J 9/1692* (2013.01); *B25J 9/1697* (2013.01); *Y10S 901/47* (2013.01)

(58) Field of Classification Search
CPC .......... B25J 9/1692; B25J 9/1697; B25J 9/16; Y10S 901/47
USPC .................... 700/245, 254, 258, 259; 901/47; 318/568.11, 568.12, 568.16, 568.17, 318/568.19, 568.21, 568.22; 382/153
See application file for complete search history.

(56) References Cited

U.S. PATENT DOCUMENTS 4,613,943 A   9/1986 Miyake et al.
5,194,792 A   3/1993 Hara
(Continued)

FOREIGN PATENT DOCUMENTS

DE   60 2005 003 147 T2   8/2008
EP        1 584 426 A1   10/2005
(Continued)

OTHER PUBLICATIONS

Tsai, Roger Y., "An Efficient and Accurate Camera Calibration Technique for 3D Machine Vision," Proc. Computer Vision and Pattern Recognition '86, 1986, pp. 364-374.
(Continued)

*Primary Examiner* — Dalena Tran
*Assistant Examiner* — Jaime Figueroa
(74) *Attorney, Agent, or Firm* — Drinker Biddle & Reath LLP

(57) ABSTRACT

A measurement apparatus for determining a position of a tool center point (31) of a tool (30), which is attached to a tool attachment surface (32) of a robot (1), with respect to the tool attachment surface (32) includes: a camera (4) attached to the arm tip portion of the robot (1); a touch-up point (an origin of $\Sigma m$) disposed in a working space of the robot; a measurement section (11a) for measuring the position of the touch-up point by using the robot and the camera; a first storage section (12a) for storing the measured position of the touch-up point; a second storage section (12b) for storing a position of the robot (1) when the tool center point is aligned with the touch-up point by moving the robot; and a calculation section (11b) for calculating the position of the tool center point with respect to the tool attachment surface of the robot by using the stored positions of the touch-up point and the robot. Therefore, the position of the tool center point with respect to the tool attachment surface is measured with high accuracy in a short period of time without using a substitution jig.

6 Claims, 6 Drawing Sheets

(56) References Cited

U.S. PATENT DOCUMENTS

| | | | |
|---|---|---|---|
| 5,297,238 | A | 3/1994 | Wang et al. |
| 5,329,469 | A | 7/1994 | Watanabe |
| 5,457,367 | A | 10/1995 | Thorne |
| 5,471,312 | A | 11/1995 | Watanabe et al. |
| 5,876,325 | A | 3/1999 | Mizuno et al. |
| 5,910,719 | A | 6/1999 | Thorne |
| 6,044,308 | A | 3/2000 | Huissoon |
| 6,236,896 | B1 | 5/2001 | Watanabe et al. |
| 6,941,192 | B2 | 9/2005 | Tang et al. |
| 7,161,321 | B2 | 1/2007 | Ban et al. |
| 2003/0144765 | A1 | 7/2003 | Habibi et al. |
| 2003/0167103 | A1 | 9/2003 | Tang et al. |
| 2005/0107920 | A1 | 5/2005 | Ban et al. |
| 2005/0159842 | A1 | 7/2005 | Ban et al. |
| 2005/0225278 | A1 | 10/2005 | Ban et al. |
| 2006/0218680 | A1 | 9/2006 | Bailey, III |
| 2007/0156121 | A1 | 7/2007 | Millman et al. |
| 2008/0252248 | A1 | 10/2008 | Lundberg et al. |
| 2008/0300723 | A1 | 12/2008 | Ban et al. |

FOREIGN PATENT DOCUMENTS

| | | |
|---|---|---|
| EP | 1 875 991 A2 | 1/2008 |
| JP | 1-119806 | 5/1989 |
| JP | 1-257593 | 10/1989 |
| JP | 3394322 | 11/1995 |
| JP | 8-85083 | 4/1996 |
| JP | 8-132373 | 5/1996 |
| JP | 3733364 | 10/2005 |
| JP | 4021413 | 10/2007 |
| JP | 2008-188705 | 8/2008 |
| JP | 4191080 | 9/2008 |
| WO | WO 01/00370 A1 | 1/2001 |

OTHER PUBLICATIONS

Japanese Notice of Reasons for Rejection mailed Dec. 7, 2010 issued in Japanese Application No. 2009-180757 (including a partial translation thereof).

Watanabe et al., A Kinematic Calibration Method for Industrial Robots Using Autonomous Visual Measurement, 2006, CIRP Annals-Manufacturing Technology, vol. 55, Issue 1, pp. 1-6.

Watanabe et al., Automomous Visual Measurement for Accurate Setting of Workpieces in Robotic Cells, 2005, CIRP Annals-Maufacturing Technology, vol. 54, Issue 1, pp. 13-18.

Hallenberg, Johan, Robot Tool Center Point Calibration Using Computer Vision, Feb. 2007, Linkoping University, Sweden, Master's Thesis in Computer Vision, pp. 1-89.

APPARATUS AND METHOD FOR MEASURING TOOL CENTER POINT POSITION OF ROBOT

This application is a continuation application of copending U.S. patent application Ser. No. 12/838,046, filed on Jul. 16, 2010. The co-pending U.S. patent application Ser. No. 12/838,046 is incorporated by reference herein in its entirety.

BACKGROUND OF THE INVENTION

1. Field of the Invention

The present invention relates to a measurement method for measuring a position of a tool center point of a robot and a measuring apparatus for implementing such method.

2. Description of the Related Art

When using an industrial robot, a position of a tool center point (TCP) with respect to a tool attachment surface of the robot is measured. The measurement of the tool center point is a fundamental and important operation and it is performed mainly by one of two ways.

In Japanese unexamined patent publication No. H08-8.5083, an operator positions a tool center point attached to a tip of a robot at a particular point in a space with a plurality of tool orientations to calculate the position of the tool center point by using a plurality of positioning positions. In this case, the position of the tool center point can be calculated without special jigs and the like. However, in Japanese unexamined patent publication No. H08-85083, setting accuracy of the tool center point and time required for the setting operation depend on the operator's skill and the setting accuracy and time are not always stable.

Japanese Patent No. 4191080 discloses a method for automatically measuring a position of a tool center point by using an imaging device, for example, a camera. In this case, stable setting accuracy and time can be obtained without dependence on the operator's skill. Furthermore, in Japanese Patents No. 4021413 and No. 3394322, as well as in Roger Y. Tsai, "An efficient and accurate camera calibration technique for 3d machine vision", Proc. Computer Vision and Pattern Recognition '86, pp. 364-374; 1986, measurement techniques using the robot and camera are disclosed.

However, in Japanese Patent No. 4191080, an imaging device, such as a camera is needed. Further, in Japanese Patent No. 4191080, when it is difficult to measure the setting point of the tool center point by using the imaging device, a special jig for substituting for the tool center point is needed. Moreover, when such a special jig is used, any positional error between the measurement point on the special jig and the actual, setting position of the tool center point will reduce the setting accuracy of the tool center point.

The present invention has been made in view of the above circumstances and has an object to provide a measurement method that can stably measure a position of a tool center point with respect to a tool attachment surface with high accuracy in a short time without using a special jig substituting for the tool center point, and a measurement apparatus for implementing such method.

SUMMARY OF THE INVENTION

In order to achieve the object described above, according to a first aspect, a measurement apparatus for determining a position of a tool center point of a tool, which is attached to a tool attachment surface of an arm tip portion of a robot, with respect to the tool attachment surface is provided, the measurement apparatus comprising: a camera attached to the arm tip portion of the robot; a touch-up point disposed in a working space of the robot; a measurement section for measuring the position of the touch-up point by using the robot and the camera; a measurement result storage section for storing the position of the touch-up point measured by the measurement section; an alignment result storage section for storing a position of the robot when the tool center point is aligned with the touch-up point by moving the robot; and a tool center point position calculation section for calculating the position of the tool center point with respect to the tool, attachment surface of the robot by using the position of the touch-up point stored in the measurement result storage section and the position of the robot stored in the alignment result storage section.

According to a second aspect, a measurement apparatus for determining a position of a tool center point of a tool, which is attached to a tool attachment surface of an arm tip portion of a robot, with respect to the tool attachment surface is provided, the measurement apparatus comprising: a camera attached to the arm tip portion of the robot; and a measurement target disposed in a working space of the robot, wherein the measurement target includes a touch-up point whose position is known with respect to the measurement target, and, wherein the measurement apparatus further comprises: a storage section for storing in advance the position of said touch-up point with respect to the measurement target; a measurement section for measuring a position and posture of the target by using the robot and the camera; a measurement result storage section for storing the position and posture of the target measured by the measurement section; an alignment result storage section for storing a position of the robot when the tool center point is aligned with the touch-up point by moving the robot; and a tool center point position calculation section for calculating the position of the tool center point with respect to the tool attachment surface of the robot by using the position and posture of the target stored in the measurement result storage section, the position of the robot stored in the alignment result storage section, and the position of the touch-up point stored in the storage section.

According to a third aspect, as in the second aspect, the target has measurement objects whose sizes and relative positions are known and that are arranged in a matrix.

According to a fourth aspect, as in the second aspect, the target has three measurement objects whose sizes and relative positions are known and that are not in line with each other.

According to a fifth aspect, a measurement method for determining a position of a tool center point of a tool, which is attached to a tool attachment surface of an arm tip portion of a robot, with respect to the tool attachment surface is provided, comprising the steps of: measuring a position of a touch-up point disposed in a working space of the robot by using the robot and a camera attached to the arm tip portion of the robot; storing the measured position of the touch-up point in a measurement result storage section; aligning the tool center point with the touch-up point after moving the robot; storing, in an alignment result storage section, a position of the robot when the tool center point is aligned with the touch-up point; and determining the position of the tool center point with respect to the tool attachment surface of the robot by using the position of the touch-up point stored in the measurement result storage section and the position of the robot stored in said alignment result storage section.

According to a sixth aspect, a measurement method for determining a position of a tool center point of a tool, which is attached to a tool attachment surface of an arm tip portion of a robot, with respect to the tool attachment surface is provided, comprising the steps of: storing, in a storage section, a position of a touch-up point whose position is known in a coordinate system fixed to a measurement target disposed in a working space of the robot; measuring a position and posture of the coordinate system fixed to the target by using the robot and a camera attached to the arm tip portion of the robot; storing the measured position and posture of the target in a measurement result storage section; aligning the tool, center point with the touch-up point after moving the robot; storing, in an alignment result storage section, a position of the robot when the tool center point is aligned with the touch-up point; and calculating the position of the tool center point with respect to the tool attachment surface of the robot by using the position and posture of the target stored in the measurement result storage section, the position of the robot stored in the alignment result storage section, and the position of the touch-up point in the coordinate system stored in the storage section.

These and other objects, features and advantages of the present invention will be more apparent in light of the detailed description of exemplary embodiments thereof as illustrated by the drawings.

DETAILED DESCRIPTION

Figure 1:
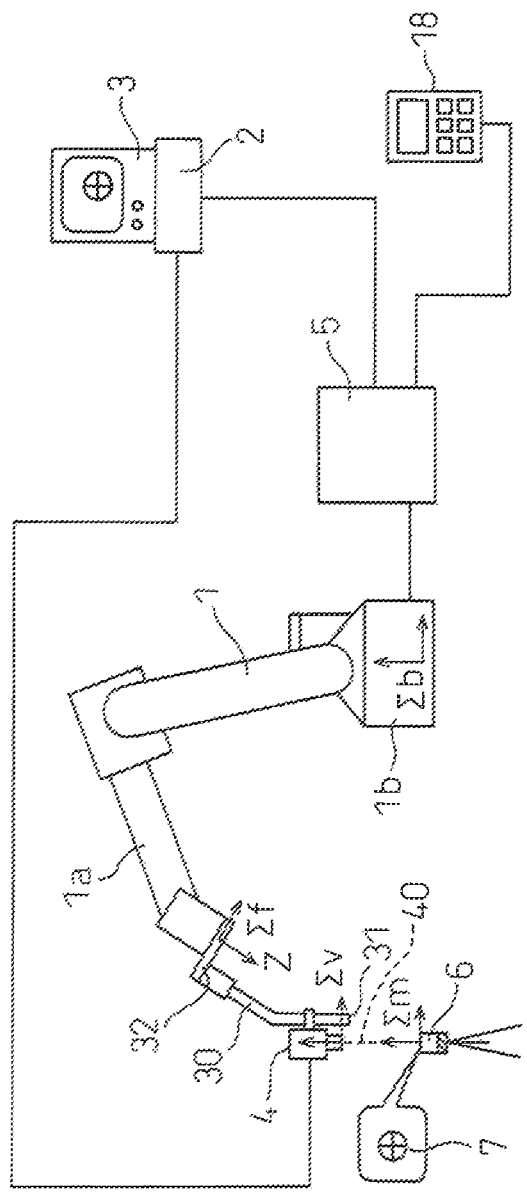
FIG. 1 is a diagram, illustrating an overall configuration of a measurement apparatus in a first embodiment of the present invention.

Hereinafter, the embodiments of the present invention will be described with reference to the accompanying drawings. In the drawings, like elements are designated by like reference numerals. For ease of understanding, the scale of the drawings has been changed appropriately.

FIG. 1 is a diagram illustrating an overall configuration of a measurement apparatus in a first embodiment of the present invention. As illustrated in FIG. 1, a robot 1 is a publicly known typical robot such as, for example, a six-axis articulated robot. Robot 1 has an arm portion 1a and a base portion 1b. Robot 1 is connected to a robot controller 5 for controlling robot 1.

A tool 30 is attached to a tip portion or a tool attachment surface 32 of arm portion 1a. Tool 30 illustrated in FIG. 1 is bent obtusely. Then, a camera 4 is adjacently attached to a neighborhood of the tip of tool 30. As can be seen from the figure, in the first embodiment, a view line 40 of camera 4 extends in parallel with the tip portion of the tool.

As illustrated in FIG. 1, in robot 1, a robot coordinate system $\Sigma b$ fixed to a base portion 1b and a mechanical interface coordinate system $\Sigma f$ fixed to tool attachment surface 32 are defined. Robot controller 5 can recognize a position and posture (a current position) of an origin of mechanical interface coordinate system $\Sigma f$ at any time. Further, a teaching control panel 18 provided with well-known manual operation keys is connected to robot controller 5, so that an operator can operate robot 1 by manipulating the manual operation keys.

Camera 4 is, for example, a CCD camera that is a well-known light receiving device having a function for detecting a two-dimensional image on a light receiving surface (CCD array surface). Camera 4 is connected to an image processing device 2 provided with a monitor 3 such as an LCD, CRT and the like. In the first embodiment, camera 4 captures an image of a mark 7 on a target 6 that is fixed in a space represented by robot coordinate system $\Sigma b$. Target 6 is, for example, a metallic column that has a cross-shaped groove formed on its end face. However, target 6 may have other shapes so long as its center position can be identified.

Figure 2:
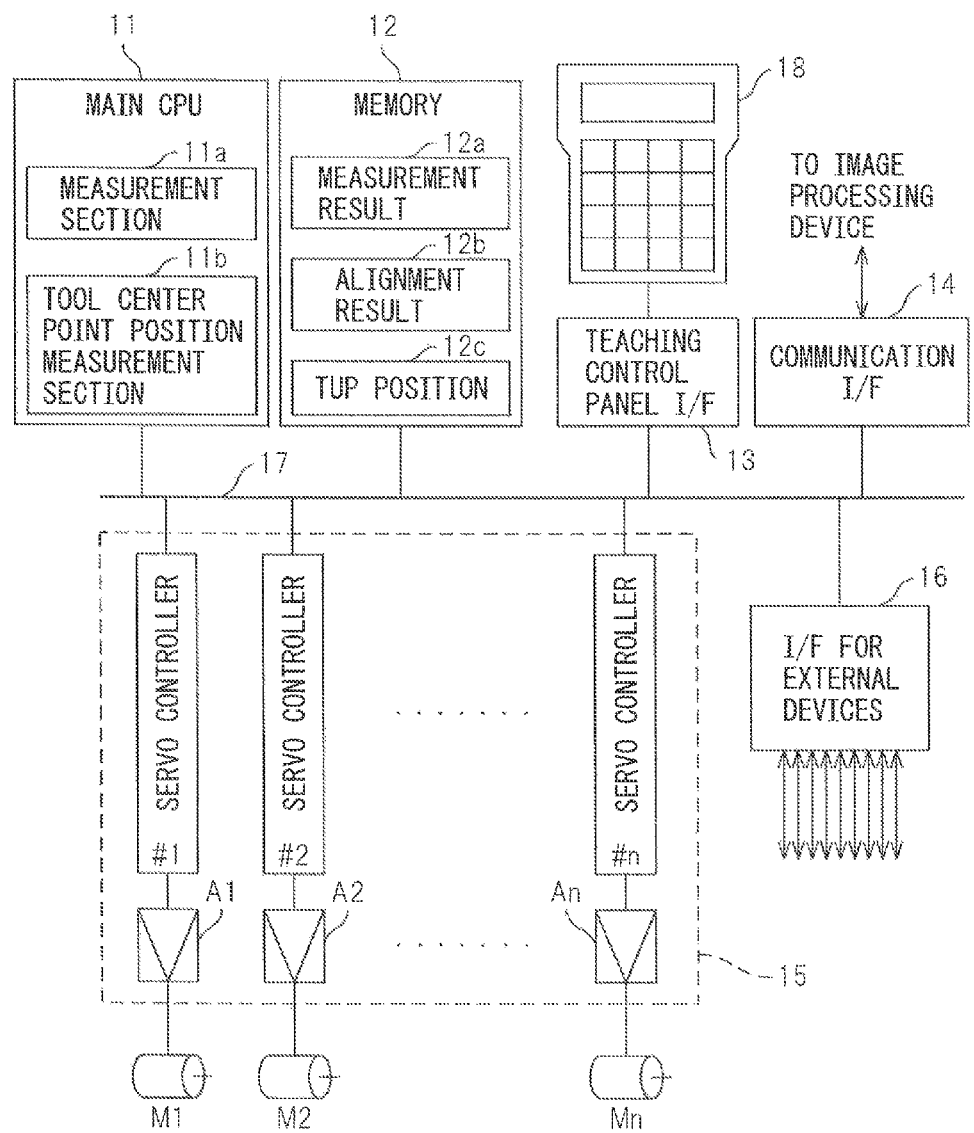
FIG. 2 is a block diagram of a robot controller used in the present invention.

FIG. 2 is a block diagram of the robot controller used in the present invention. As illustrated in FIG. 2, robot controller 5 includes a main CPU (hereinafter simply referred to as CPU) 11. Main CPU 11 acts as: a measurement section 11a for measuring a position of a touch-up point disposed in a working space of the robot by using robot 1 and camera 4; and a tool center point position calculation section 11b for calculating a position of a tool center point 31 with respect to tool attachment surface 12 of robot 1.

Then, a memory 12 such as a RAM, ROM, non-volatile memory and the like, a teaching control panel interface 13, an input/output interface 16 for external devices, a servo control section 15, and a communication interface 14 are connected in parallel to a bus 17 extending from main CPU 11.

Teaching control panel 16 is connected to teaching panel interface 13. The operator operates teaching control panel 18 to perform generation, correction and registration of robot operation programs and various parameter settings, as well as playback operation, jog feeding and the like of caught operation programs.

System programs that support basic functions of the robot and the robot controller are stored in the ROM in memory 12. Further, the robot operation programs and related configuration data that are taught according to applications are stored in the non-volatile memory in memory 12. Programs and data such as parameters and the like for processes described below (robot motion in relation to determine mechanism parameters, communication processes with the image processing device, and so on) are also stored in the non-volatile memory in memory 12. The RAM in memory 12 is used as a storage area for temporarily storing data in various computations performed by CPU 11.

Further, as can be seen from the figure, memory 12 includes: a measurement result storage section 12a for storing the position of the touch-up point measured by measurement section 11a; an alignment result storage section 12b for storing a position of robot 1 when tool center point 31 is aligned with the touch-up point; and a storage section 12c for storing in advance the position of the touch-up point in the coordinate system fixed with respect to a measurement target 600.

A servo control section 15 comprises servo controllers #1 to #n (where n is the total number of axes of the robot and it is assumed that n=6 here). Servo control section 15 receives move commands generated by the computations for controlling the robot (preparation of trajectory planning and interpolation, inverse transformation and the like based on the trajectory planning) and outputs torque commands to servo amplifiers A1 to An along with feedback signals received from pulse coders (not illustrated) attached to the respective axes. Based on the torque commands, servo amplifiers A1 to An supply currents to drive servo motors of the respective axes. Communication interface 14 is connected to image processing device 2, (See FIG. 1.) Via this communication interface 14, commands, measurement result data and the like in relation to the measurement described below are transferred between robot controller 5 and image processing device 2.

Figure 3:
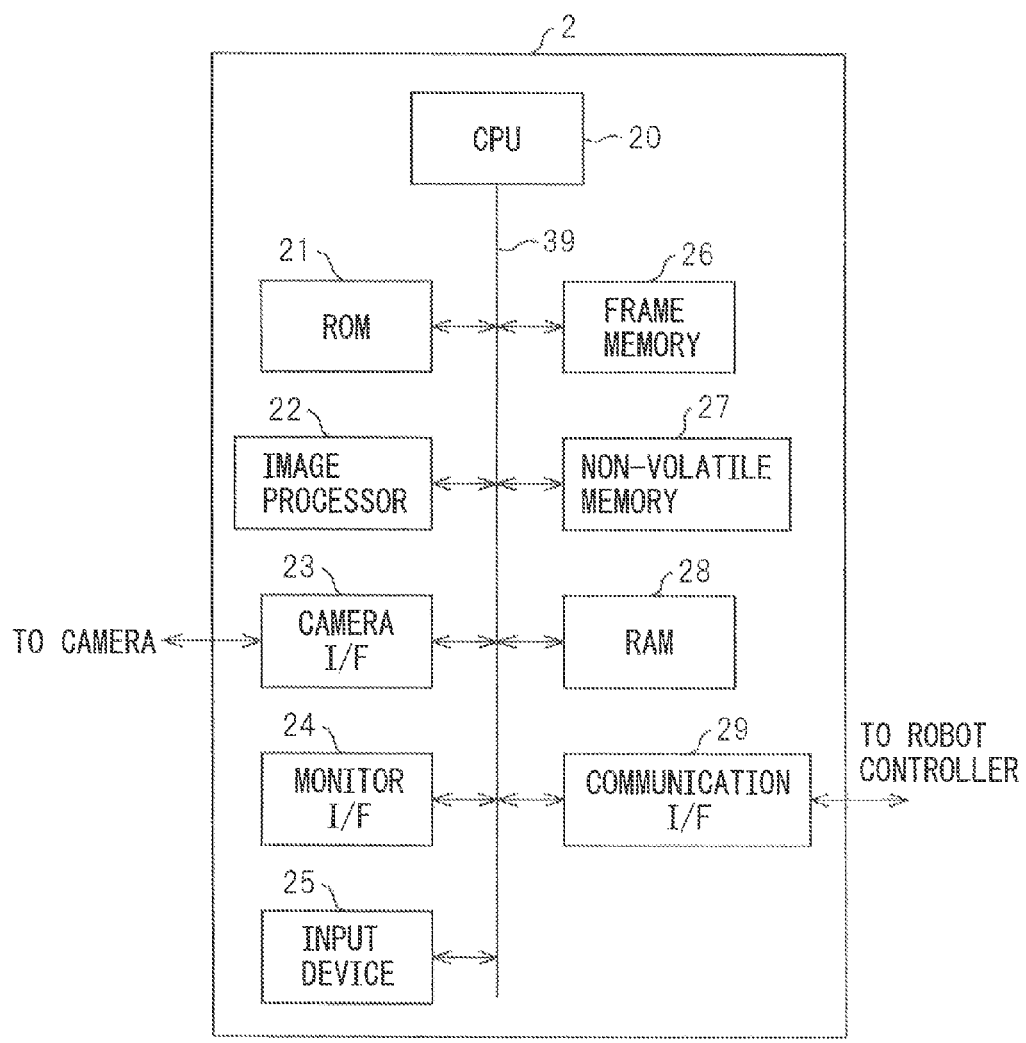
FIG. 3 is a block diagram of an image processing device used in the present invention.

FIG. 3 is a block diagram of the image processing device used in the present invention. As illustrated in FIG. 3, image processing device 2 has a CPU 20 that is a microprocessor. Then, a ROM 21, an image processor 22, a camera interface 23, a monitor interface 24, an input/output device (I/O) 25, a frame memory (image memory) 26, a non-volatile memory 27, a RAM 28 and a communication interlace 29 are connected to CPU 20 via a bus line 33.

Camera 4 that is imaging means (a CCD camera) is connected to camera interface 23. Once an image capture command is sent via camera interface 23, camera 4 captures an image by using an electronic shutter function provided in the camera. Then, an image signal in the form of a gray scale signal is stored in frame memory 26 via camera: interface 23.

A display such as a CRT, LCD and the like is connected to monitor interface 24 as monitor 3, (See FIG. 1.) Images that are currently being captured by the camera, previous images stored in frame memory 26, images processed by image processor 22 and the like are displayed as necessary.

Camera 4 illustrated in FIG. 1 captures the image of mark 7 on target 6 that is fixed in the space represented by robot coordinate system Σb. The image signal of mark 7 stored in frame memory 26 is analyzed by using image processor 22 to determine its two-dimensional position, size and the like. Programs, parameters and the like for this purpose are stored in non-volatile memory 27. Further, RAM 28 is used to temporarily store data necessary for various processes performed by CPU 20. Communication interface 29 is connected to the robot controller via communication interface 14 of the robot controller described above.

View line 40 of camera 4 illustrated in FIG. 1 is a straight line from a representative point of camera 4 (for example, the center of the camera's lens) toward target 6. With regard to view line 40, a coordinate system Σv illustrated in FIG. 1 represents view line 40 from the representative point of camera 4 (for example, the center of the camera's lens) toward target 6, wherein it is assumed that its origin is located on view line 40 and one coordinate axis (for example, the Z-axis) coincides with view line 40.

Mechanical interface coordinate system Σf represents not only the position and posture of tool attachment surface 32 described above but also "the position and posture of robot 1". In other words, unless otherwise noted, it is assumed that "the robot position" is "a position of the origin of mechanical interface coordinate system Σf on robot coordinate system Σb". When the posture is taken into account, it refers to "a position and posture of the origin of mechanical interface coordinate system Σf on robot coordinate system Σb".

Figure 4:
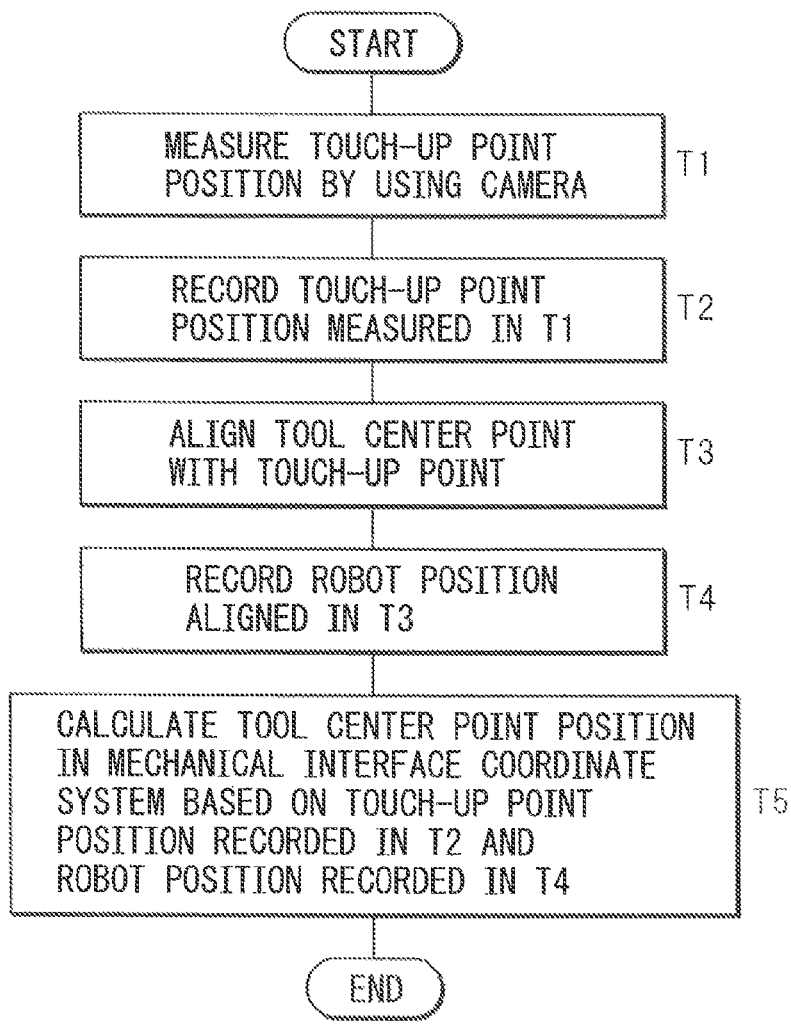
FIG. 4 is a flow chart schematically illustrating a process performed in the present invention.

FIG. 4 is a flow chart schematically illustrating a process performed in the present invention. Hereinafter, with reference to FIG. 4, a calibration procedure in the measurement apparatus of the present invention will be described. In the configuration illustrated in FIG. 1, it is assumed that the touch-up point (TUP) is located at an origin of a coordinate system Σm on target 6.

Step T1

In the present invention, measurement section 11a uses camera 4 to measure the position of the origin (Xm, Ym, Zm) of coordinate system Σm fixed to target 6 or in other words, the position of the touch-up point. In order to measure this position, a publicly known measurement method described in Japanese Patent No. 4021413 applied by the applicant of the present invention may be adopted. In this measurement method, the camera is attached to the tip of the robot arm and determines the attachment position and the view line direction of the camera without calibrating the camera. Then, a reference point position on a workpiece disposed in a working space of the robot is measured by stereo measurement. The position of the origin (Xm, Ym, Zm) of coordinate system Σm fixed to target 6 may be measured by other techniques.

Step T2

In step T2, the position of the origin (Xm, Ym, Zm) of target 6 determined in step T1 is stored in measurement result storage section 12a as the position of the touch-up point.

Step T3

Figure 5:
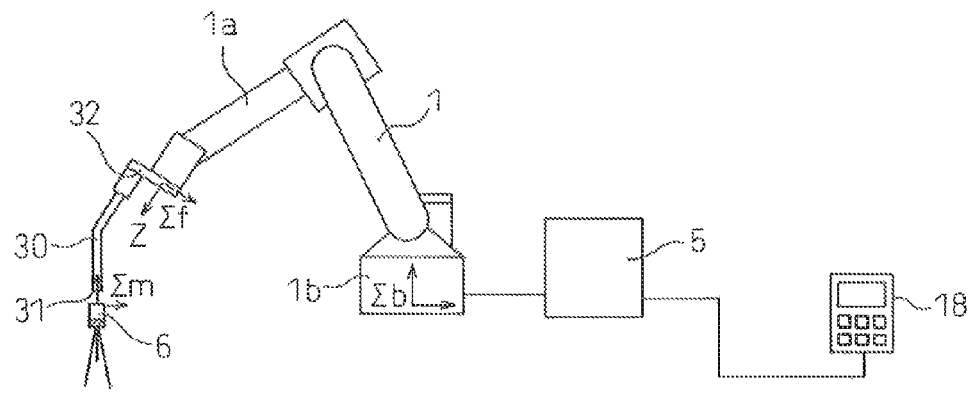
FIG. 5 is a diagram illustrating a state in which a tool center point is moved from the state of FIG. 1 and aligned with a touch-up point of a target.

Then, the operator visually aligns tool center point 31 with the origin of target 6 or the touch-up point. (See FIG. 5.) Alternatively, robot 1 may automatically operate to align tool center point 31 with the origin of target 6.

Step T4

In step T4, the position of the robot aligned in step T3 is stored in alignment result storage section 12b.

Step T5

In step T5, based on the position of the touch-up point and the position of the robot stored in measurement result storage section 12a and alignment result storage section 12b, respectively, tool center point position calculation section 11b calculates the position of tool center point 31 according to the following algorithm.

The position of the touch-up point stored in step T2 is (Xm, Ym, Zm). The posture of the touch-up point is undefined and the posture is set to (0, 0, 0). A 4×4 homogeneous transformation matrix [M] corresponding to the position and posture of the touch-up point (Xm, Ym, Zm, 0, 0, 0) is represented by equation 1:

$$[M] = \begin{bmatrix} 1 & 0 & 0 & X_m \\ 0 & 1 & 0 & Y_m \\ 0 & 0 & 1 & Z_m \\ 0 & 0 & 0 & 1 \end{bmatrix} \quad \text{Equation 1}$$

Then, from the robot position stored in alignment result storage section 12b in step T4, the position and posture of mechanical interface coordinate system Σf is expressed by a 4×4 homogeneous transformation matrix [F] in the following equation 2:

$$[F] = \begin{bmatrix} & & & X_f \\ & [R_F] & & Y_f \\ & & & Z_f \\ 0 & 0 & 0 & 1 \end{bmatrix} \quad \text{Equation 2}$$

where $[R_F]$ is a 3×3 rotation matrix corresponding to an posture angle of coordinate system Σf.

Then, a 4×4 homogeneous transformation matrix corresponding to the position and posture of a coordinate system Σt whose origin is the tool center point in mechanical interface coordinate system Σf is defined as [T]. (See equation 4.) in this case, because [M]=[F] [T], [T] can be calculated from the following equation 3:

$$[T] = [F]^{-1}[M] \quad \text{Equation 3}$$

$$[T] = \begin{bmatrix} & & & X_t \\ & [R_T] & & Y_t \\ & & & Z_t \\ 0 & 0 & 0 & 1 \end{bmatrix} \quad \text{Equation 4}$$

where $[R_T]$ in equation 4 is a 3×3 rotation matrix corresponding to a posture angle of coordinate system Σt. Further, components (Xt, Yt, Zt) in matrix T in equation 4 represent the position of the tool center point in mechanical interface coordinate system Σf.

As described above, in the present invention, the position of tool center point 31 can be automatically measured by using the noncontact measurement section, for example, camera 4. Further, in the present invention, the touch-up operation (alignment operation) is needed only once in the measurement procedure. Therefore, it can be seen, that high-accuracy measurement results can be stably obtained in a short period of time while reducing the operator's burden without dependence on the operator's skill and without using a special tool substituting for fool center point 31.

Further, in the present invention, the position of tool center point 31 is determined indirectly through the alignment operation that can be performed by the operator. Therefore, the present invention can be applied even when tool 30 is a tool that is difficult to be directly measured by using the camera, for example, a welding wire projecting from an arc welding torch tip and the like.

Figure 6:
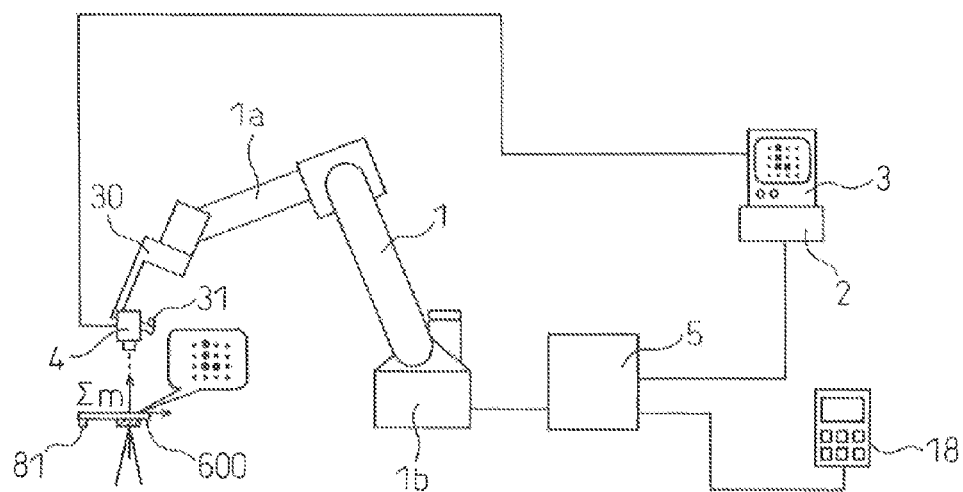
FIG. 6 is a diagram illustrating an overall configuration of a measurement apparatus in a second embodiment of the present invention.

FIG. 6 is a diagram illustrating an overall configuration of a measurement apparatus in a second embodiment of the present invention. A tool illustrated in FIG. 6 has a C-shaped configuration and its tool center point 31 is located inside of a tip side of the C-shaped part. Thus, the direction in which tool center point 31 projects is opposite to the direction of measurement of camera 4.

Due to this configuration of the tool, in the second embodiment, tool center point 31 cannot directly touch up target 6. In this case, the touch-up point may not be set at the origin of coordinate system Σm but may be set at a location whose position in coordinate system Σm is known. In FIG. 6, plate-like target 600 is used and touch-up point 81 is provided in a corner of the bottom surface of measurement target 600. Therefore, also in the second embodiment, the position of tool center point 31 can be calculated by the procedure described below.

A plurality of circular objects are formed and arranged in a matrix on the top surface of target 600 illustrated in FIG. 6. In other words, target 600 includes a dot pattern. These circular objects are formed as printed or colored areas, recesses or holes. Sizes and positional relationships of these circular objects are stored in storage section 12c. As can be seen from FIG. 6, each of these circular objects is sufficiently small in comparison with the capturing field of view of camera 4. Further, in FIG. 6, among the plurality of circular objects, only four circular objects that form an L-shape have a larger diameter than that of the other circular objects.

By using target 600 described above, the relative position and posture between the camera and the objects (circles) can be measured even if camera 4 is two-dimensional. Such measurement is often used in a process that is typically referred to as camera calibration. A specific example of this measurement is described in Roger Y. Tsai, "An efficient and accurate camera calibration technique for 3d machine vision", Proc. Computer Vision and Pattern Recognition '86, pp. 364-374, 1986. Theoretically, at least three measurement objects or if an error in a camera lens is taken into account, at least seven measurement objects are needed.

By using target 600 having a group of the circular objects (the dot pattern) as described above, the calibration of the camera and the measurement of coordinate system Σm can be performed at the same time. More specifically, a publicly known measurement technique set forth in Japanese Patent No. 3394322 may be adopted.

In the second embodiment, assuming that a coordinate system Σp is fixed to the touch-up point, a homogeneous transformation matrix [P] expressing the position and posture of this coordinate system Σp in robot coordinate system Σb can be calculated by the following equation 5;

$$[P]=[M][S] \quad \text{Equation 5}$$

where [S] is a 4×4 homogeneous transformation matrix corresponding to the position and posture of coordinate system Σp in coordinate system Σm.

Figure 7:
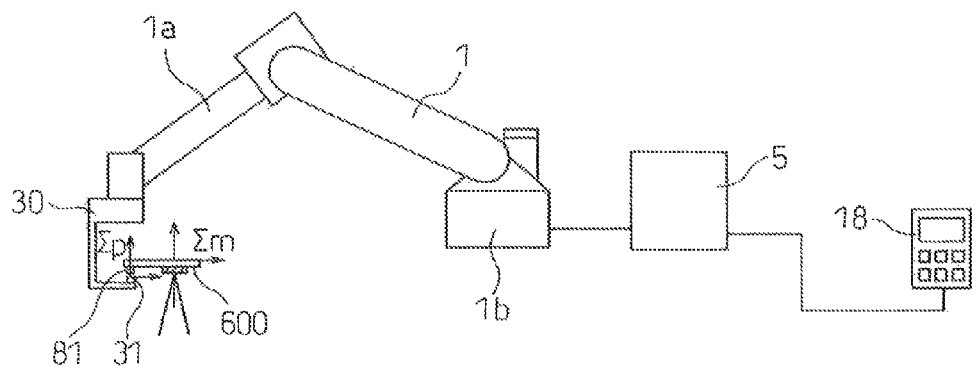
FIG. 7 is a diagram illustrating a state in which the tool center point is moved from the state of FIG. 6 and aligned with the touch-up point of the target.

FIG. 7 is a diagram, illustrating a state in which tool center point 31 is aligned with touch-up point 81 of target 600 from the state of FIG. 6. As illustrated in FIG. 7, if the relative position and posture between two coordinate systems Σm and Σp is known and target 600 having a group of a plurality of circular objects is used, first, the position and posture of Σm in the coordinate system Σb can be obtained in step T1. Thus, [M] can be determined. If [S] is made known in advance during the design and fabrication of target 600, [P] can be easily calculated based on equations 5 and 6 as follows;

$$[P] = [M][S] = \begin{bmatrix} & & & X_p \\ & [R_P] & & Y_p \\ & & & Z_p \\ 0 & 0 & 0 & 1 \end{bmatrix} \quad \text{Equation 6}$$

According to the touch-up operation illustrated in FIG. 7, [P]=[F][T] and, therefore, $[T]=[F]^{-1}[P]$. By using this equation, [T] is determined. As described above, in the second embodiment, even when tool center point 31 cannot directly touch up target 600, the position of tool center point 31 can be determined and an effect similar to that of the first embodiment can be obtained.

Figure 8:
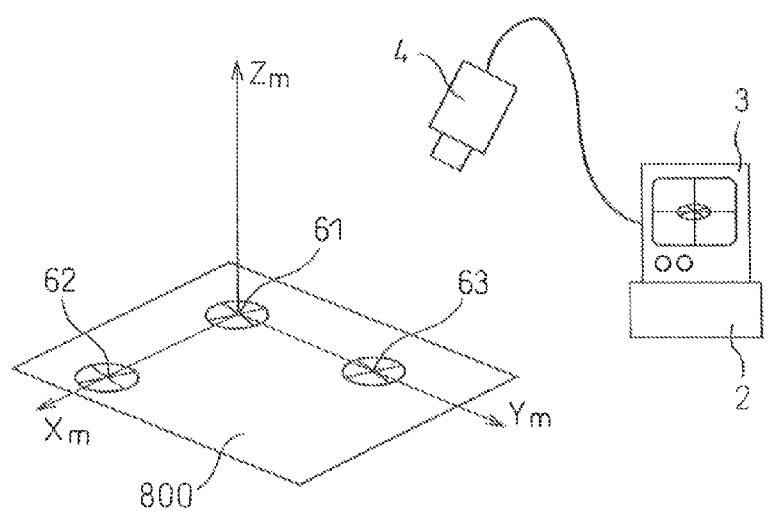
FIG. 8 is an enlarged view of a target of a different type that is used in the second embodiment of the present invention.

Further, in place of target 600, a target 800 that has three measurement objects 61, 62 and 63 as illustrated in FIG. 8 may be used. When each of measurement objects 61, 62 and 63 is measured individually, only a particular region of the lens of camera 4 is used and, therefore, it is not necessary to calibrate camera 4. More specifically, a publicly known measurement technique set forth in Japanese Patent No. 3733364 or No. 4021413 may be adopted. Further, in this case, because distances between any two of the three measurement objects can be made sufficiently long, the posture can be measured, with higher accuracy.

In order to calculate the orientation of the target, positions of at least three measurement objects are needed. However, it is not necessary that the three measurement objects are located at vertexes of a right-angled triangle. It suffices that the three measurement objects are not in line with each other. Further, there may be more than three measurement objects. Measurement error can be reduced by averaging multiple results.

Whether or not target 600 or 800 is adopted, the orientation of the coordinate system fixed to the target can be accurately measured by using these circular objects.

Further, in an unillustrated embodiment, these circular objects 61, 62 and 63 may be directly formed on a jig whose position is known in the robot system. In this case, target 600 itself can be omitted.

Though it is assumed that camera 1 is two-dimensional in the above description, camera 4 may be a stereo camera. Alternatively, a measurement apparatus that is comprised of a two-dimensional camera and a laser projector and that can perform three-dimensional measurement may be used in place of camera 4. Also in this case, it can be seen that the position setting of the tool center point can be similarly measured.

Effect of the Invention

In the first aspect, the position of the tool center point of the robot is automatically measured by using the noncontact measurement section, for example, the camera, and the touch-up operation is needed only once. Therefore, high-accuracy measurement results can be stably obtained while reducing an operator's burden without dependence on the operator's skill. In the first aspect, the measurement section, for example, the camera directly measures the touch-up point. Further, because the position of the tool center point is determined indirectly through the touch-up operation by the operator, the present invention can be applied even to a tool that is difficult to be directly measured by using the camera, for example, a welding wire projecting from an arc welding torch tip.

In the second aspect, even when the tool center point cannot directly touch up the target, an effect similar to that of the first aspect can be obtained.

In the third aspect, the position and posture of said target can be measured.

In the fourth aspect, because each of the three measurement objects is measured individually, distances between any two of the three measurement objects can be sufficiently long. Therefore, the posture can be measured with higher accuracy. The measurement objects are, for example, circular recesses or holes. The measurement objects may be formed on a jig in a robot system. In one embodiment, the circular recesses are located at vertexes of a triangle, In the fifth aspect, the position of the tool center point of the robot is automatically measured by using the noncontact measurement section, for example, the camera, and the touch-up operation is needed only once. Therefore, high-accuracy measurement results can be stably obtained while reducing an operator's burden without dependence on the operator's skill. In the fifth aspect, the measurement section, for example, the camera directly measures the touch-up point. Further, because the position of the tool center point is determined indirectly through the touch-up operation by the operator, the present invention can be applied even to a tool that is difficult to be directly measured by using the camera, for example, a welding wire projecting from an arc welding torch tip.

In the sixth aspect, even when the tool center point cannot directly touch up the target, an effect similar to that of the fifth aspect can be obtained.

Although the invention has been shown and described with exemplary embodiments thereof, it should be understood by those skilled in the art that the foregoing and various other changes, omissions and additions may be made therein and thereto without departing from the scope of the invention.

The invention claimed is:

1. A measurement apparatus for determining a position of a tool center point of a tool, which is attached to a tool attachment surface of an arm tip portion of a robot, with respect to said tool attachment surface, the measurement apparatus comprising:
   a camera attached to the arm tip portion of said robot;
   a touch-up point disposed in a working space of said robot;
   a measurement section for measuring the position of said touch-up point by using said robot and said camera;
   a measurement result storage section for storing the position of said touch-up point measured by said measurement section;
   an alignment result storage section for storing a position of said robot when said tool center point is aligned with said touch-up point only once by an operator, who visually moves said robot; and
   a tool center point position calculation section for calculating the position of said tool center point with respect to said tool attachment surface of said robot by using the position of said touch-up point stored in said measurement result storage section and the position of said robot stored in said alignment result storage section.

2. A measurement apparatus for determining a position of a tool center point of a tool, which is attached to a tool attachment surface of an arm tip portion of a robot, with respect to said tool attachment surface, the measurement apparatus comprising:
   a camera attached to the arm tip portion of said robot; and
   a measurement target disposed in a working space of said robot, wherein said measurement target includes a touch-up point whose position is known with respect to said measurement target, and
   wherein the measurement apparatus further comprises:
   a storage section for storing in advance the position of said touch-up point with respect to said measurement target;
   a measurement section for measuring a position and posture of said measurement target by using said robot and said camera;
   a measurement result storage section for storing the position and posture of said measurement target measured by said measurement section;
   an alignment result storage section for storing a position of said robot when said tool center point is aligned with said touch-up point only once by an operator, who visually moves said robot; and
   a tool center point position calculation section for calculating the position of said tool center point with respect to the tool attachment surface of said robot by using the position and posture of said measurement target stored in said measurement result storage section, the position of said robot stored in said alignment result storage section, and the position of said touch-up point stored in said storage section.

3. The measurement apparatus according to claim 2, wherein said measurement target has measurement objects whose sizes and relative positions are known and that are arranged in a matrix.

4. The measurement apparatus according to claim 2, wherein said measurement target has three measurement objects whose relative positions are known and that are not in line with each other.

5. A measurement method for determining a position of a tool center point of a tool, which is attached to a tool attachment surface of an arm tip portion of a robot, with respect to said tool attachment surface, comprising the steps of:
   measuring a position of a touch-up point disposed in a working space of said robot by using said robot and a camera attached to the arm tip portion of said robot;
   storing the measured position of said touch-up point in a measurement result storage section;
   aligning said tool center point with said touch-up point only once after an operator visually moves said robot;

storing, in an alignment result storage section, a position of said robot when said tool center point is aligned with said touch-up point; and determining the position of said tool center point with respect to said tool attachment surface of said robot by using the position of said touch-up point stored in said measurement result storage section and the position of said robot stored in said alignment result storage section.

6. A measurement method for determining a position of a tool center point of a tool, which is attached to a tool attachment surface of an arm tip portion of a robot, with respect to said tool attachment surface, comprising the steps of:

storing, in a storage section, a position of a touch-up point whose position is known in a coordinate system fixed to a measurement target disposed in a working space of said robot;

measuring a position and posture of the measurement target in the coordinate system fixed to said target by using said robot and a camera attached to the arm tip portion of said robot;

storing the measured position and posture of said target in a measurement result storage section;

aligning said tool center point with said touch-up point only once after an operator visually moves said robot;

storing, in an alignment result storage section, a position of said robot when said tool center point is aligned with said touch-up point; and calculating the position of said tool center point with respect to the tool attachment surface of said robot by using the position and posture of said measurement target stored in said measurement result storage section, the position of said robot stored in said alignment result storage section, and the position of said touch-up point in said coordinate system stored in said storage section.

* * * * *